United States Patent
Young

(10) Patent No.: US 7,161,923 B2
(45) Date of Patent: Jan. 9, 2007

(54) SYSTEM AND METHOD FOR ESTABLISHING BLUETOOTH COMMUNICATIONS

(75) Inventor: Song-Lin Young, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 998 days.

(21) Appl. No.: 09/944,890

(22) Filed: Aug. 31, 2001

(65) Prior Publication Data

US 2003/0063655 A1   Apr. 3, 2003

(51) Int. Cl.
*H04Q 7/24* (2006.01)

(52) U.S. Cl. ............... 370/338; 370/342; 370/373; 370/441; 370/479; 455/418; 455/422.1; 455/463

(58) Field of Classification Search ........ 370/441–442, 370/479, 319–373; 455/78, 422.1, 440, 515, 455/456.1, 422, 462, 418, 463
See application file for complete search history.

(56) References Cited

U.S. PATENT DOCUMENTS

| | | | |
|---|---|---|---|
| 5,509,027 A | 4/1996 | Vook et al. | 375/202 |
| 5,513,210 A | 4/1996 | Vook et al. | 375/202 |
| 5,583,866 A | 12/1996 | Vook et al. | 370/312 |
| 5,940,431 A | 8/1999 | Haartsen et al. | 375/202 |
| 6,128,504 A | 10/2000 | Ciccone | 455/464 |
| 6,377,608 B1* | 4/2002 | Zyren | 375/132 |
| 6,519,460 B1* | 2/2003 | Haartsen | 455/452.1 |
| 6,744,753 B1* | 6/2004 | Heinonen et al. | 370/338 |
| 6,754,250 B1* | 6/2004 | Haartsen | 375/132 |
| 2002/0045424 A1* | 4/2002 | Lee | |

OTHER PUBLICATIONS

Blue Tooth Specification Version 1.1, dated Feb. 22, 2001, pp. 92-105 and 113-116.*

* cited by examiner

*Primary Examiner*—John Pezzlo
*Assistant Examiner*—Inder Pal Mehra
(74) *Attorney, Agent, or Firm*—Law Office of Gerald Maliszewski; Gerald Maliszewski

(57) ABSTRACT

A system and method have been provided for establishing communications with an existing Bluetooth protocol piconet. The master device of the piconet broadcasts a beacon frequency at a predetermined frequency. The beacon frequency includes the BD_addr of the master device, as well as clock information, so that an inquiring device monitoring the beacon can acquire the system timing and transmission hopping frequency sequence. In a contention period following the beacon frequency, the inquiring device transmits its own BD_addr. In response to receiving the inquiring device BD_addr, the master device provides the inquiring device with an AM_addr.

28 Claims, 5 Drawing Sheets

Fig. 1
(PRIOR ART)
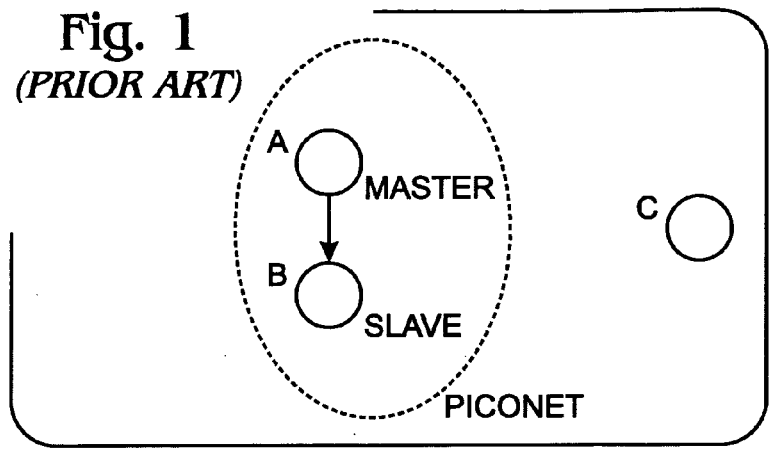
Fig. 2 (PRIOR ART)
BASEBAND PACKET FORMAT
| ACCESS CODE | HEADER | PAYLOAD |
|---|---|---|
| 72 BITS | 54 BITS | 0-2745 BITS |
Fig. 3 (PRIOR ART)
FHS PAYLOAD
| LSB 34 | 24 | 2 | 2 | 2 | 8 | 16 | 24 | 3 | 26 | MSB 3 |
|---|---|---|---|---|---|---|---|---|---|---|
| PARITY BITS | LAP | UN-IDENTIFIED | SR | SP | UAP | NAP | CLASS OF DEVICE | AM_addr | CLK$_{27\text{-}2}$ | PAGE_SCAN MODE |
Fig. 6
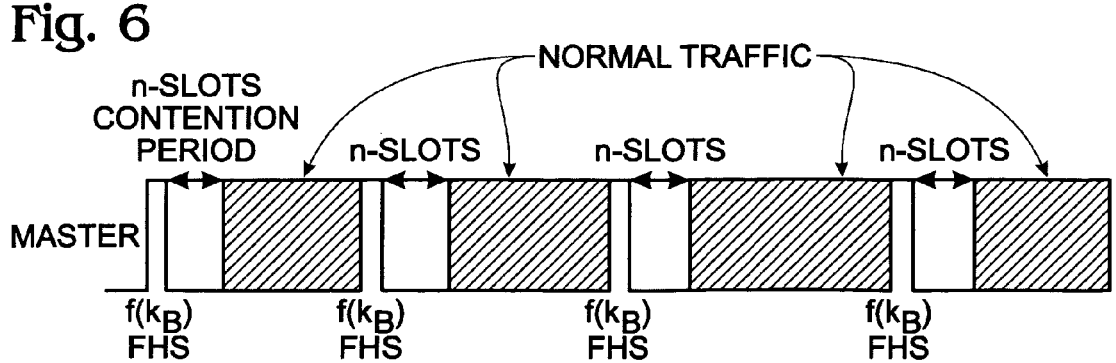

Fig. 4 *(PRIOR ART)*
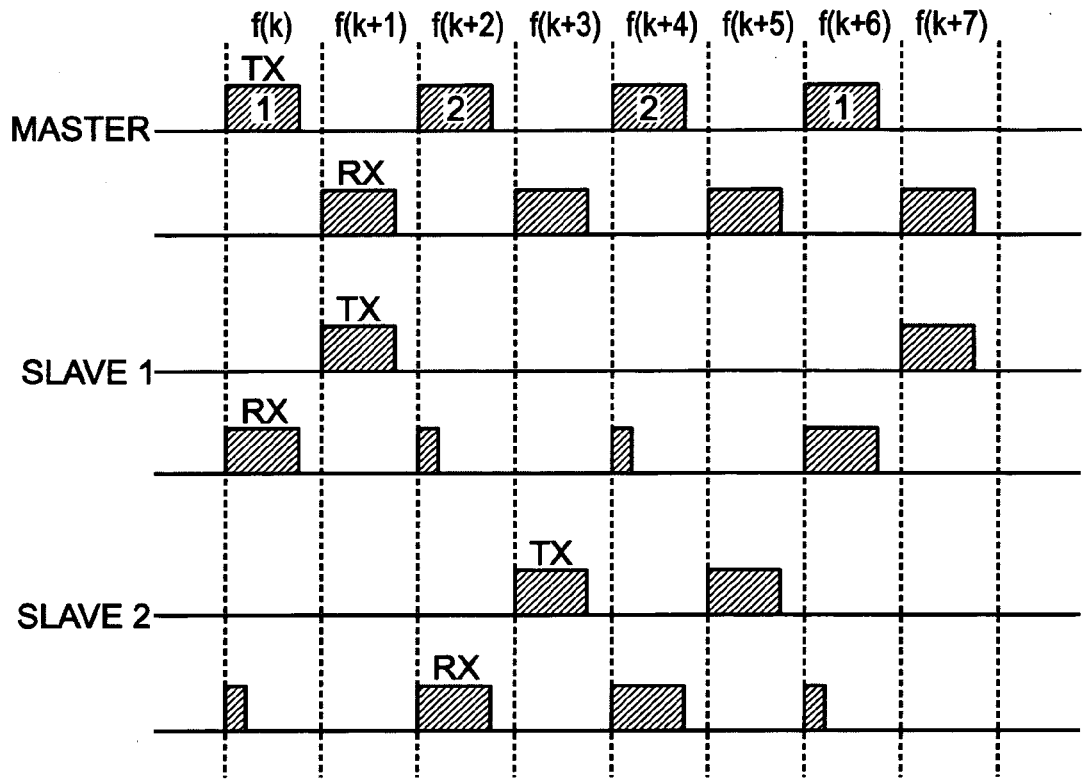
Fig. 5
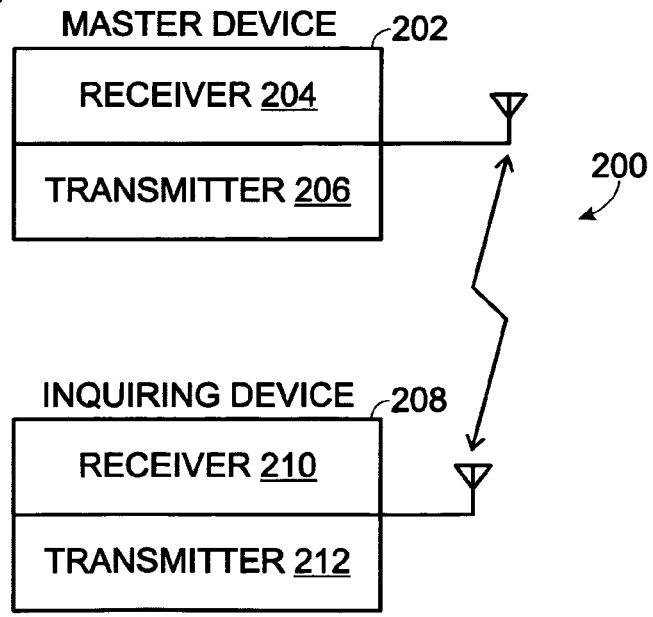

SYSTEM AND METHOD FOR ESTABLISHING BLUETOOTH COMMUNICATIONS

BACKGROUND OF THE INVENTION

1. Field of the Invention

This invention generally relates to wireless communications and, more particularly, to a system and method for initiating and establishing a Bluetooth protocol network connection.

2. Description of the Related Art

Bluetooth is a protocol for short-range wireless communications. The current mechanism for a Bluetooth device to access a local network of linked Bluetooth devices (a piconet) requires several steps. First, an inquiry is performed to find all nearby devices. Then, a Service Discovery Protocol (SDP) is used to discover whether any of the found devices perform a service required by the inquiring device. Finally, the inquiring device makes a connection to the device that provides the required service.

Each of these process steps can take a long time to complete. For example, an inquiry typically takes 10 seconds and there is no guarantee that all the surrounding devices are found. It should also be noted that the query services associated with SDP actually involve the establishment of baseband link, as well as Link Manger Protocol (LMP), Logic Link Control, and Adaptation Protocol (L2CAP) connections, as SDP uses functions in these lower layer protocols. Therefore, the time required to find a specific service among a plurality of devices can be considerable if the inquiring device has no prior knowledge of the piconet or other Bluetooth devices linked to the piconet.

The time required for a device to respond to an inquiry or page is dependent on existing piconet traffic, as the responding device needs to suspend whole, or part of its ongoing activities in order to enter the inquiry_scan or page_scan state. Thus, the throughput and capacity of existing connections in a piconet are compromised when an inquiring device attempts to establish communications with the piconet.

FIG. 1 illustrates a typical Bluetooth piconet (prior art). A Bluetooth piconet consists of a master and at least one slave. A master is a device that initiates the connection. A slave is a device that responds to the request for connection and successfully connects to the master. There can be as many as seven active slaves in one piconet. As shown in FIG. 1, A is the master, B is the slave, and C has not yet connected to either A or B.

Inquiry and Page are two basic processes needed for a Bluetooth device to establish a link at baseband level. Through an inquiry, a device receives the Bluetooth Address (BD_addr) of a nearby device, or devices. Inquiry can be skipped if a device already knows the BD_addr of the device it would like to connect with. Paging allows a device to request connection to another device with a specified BD_addr. A device must be in the inquiry_scan or page_scan states in order to respond to inquiry and/or page from other devices. Detail descriptions of the inquiry and page processes can be found in the Bluetooth Baseband Specification, which is incorporated herein by reference.

In a first scenario, a Bluetooth device is in the proximity of a piconet and is looking for a specific service. The piconet is actively carrying traffic between existing members of the piconet. This is the situation of device C in FIG. 1. The following steps must be performed before device C can become a piconet member:

1) assuming device C has no prior knowledge of the piconet and does not know of a device in the piconet that offers the service it requires, device C makes an inquiry;

2) device C pages all the devices it finds;

3) if a baseband link is established to a slave device, device C proceeds with higher layer protocols, so that SDP can be used to query for the desired service attributes;

4) Step 3 is repeated with other devices until the desired service is found; and, 5) a connection to the device providing the desired service is established, with all necessary upper layer protocols and application profiles.

There are several problems that can occur in the above-mentioned scenario. First, the inquiry process is rather lengthy, typically taking 10.24 seconds to perform. There is no guarantee that all devices within range will respond to an inquiry on the first attempt either, especially if they are part of active piconets. The success of an inquiry depends on the amount of time a responding device spends in inquiry_scan mode, and the relative clock offset between involved devices. Bad channel conditions or a large clock offset can prevent a device from replying to an inquiry.

Second, it is possible that a device in the pre-existing piconet never enters the inquiry_scan or page_scan states due to heavy traffic. How often a Bluetooth device enters discoverable or connectable states is defined in Generic Access Profile (GAP) and is implementation dependent.

Third, a scatternet may be formed if device C successfully makes a connection with both the master (device A) and the slave (device B). A scatternet is a group of piconets including one (or more) device connected to two overlapping piconets by time multiplexing. The result is two coexisting piconets with one device participating in both. According to the Bluetooth Specification, the device that initiates page is master of the piconet. When A is paged, it is slave of the new piconet, while simultaneously being master of the original piconet. When B is paged, it becomes a slave in the new piconet while remaining a slave in the original piconet. The operation of a scatternet is not well defined and it is envisaged that the overhead associated with such an event is considerable.

FIG. 2 illustrates the general format of a Bluetooth baseband packet (prior art). There are 16 different packet types currently defined in Bluetooth Specifications. Some packets may not have all three fields. For example, an ID packet includes only the Access Code (AC), and POLL/NULL packets contain both an AC and Packet Header.

FIG. 3 illustrates the payload of an FHS packet (prior art). A FHS packet is of special interest, as it is mostly used during the channel access process. The BD_addr of a device sending the packet is carried in three different fields in the FHS (frequency hop synchronization) payload: LAP, UAP, and NAP. These three fields together constitute the 48-bit BD_addr. During a Page, the master device assigns the slave device an Active Member address (AM_addr) within the piconet. The master is then able to use the AM_addr in the packet header to direct the packet to a particular active slave in the piconet. Also, the $CLK_{27-2}$ field contains the value of the system clock for device sending the FHS packet, which permits other devices to synchronize the system clock and time slot.

Bluetooth (BT) is a frequency hopping system and uses a Time Division Duplex (TDD) scheme between master and slave. Master and slave devices in a piconet follow the channel hopping sequence, which in turn, is determined by the BD_addr and clock (CLK) of the master. The channel hopping sequence will hop over all 79 frequencies in the 2.4 GHz ISM (Industrial, Scientific, Medical) band. The appearance of each frequency is pseudo random and of equal probability.

FIG. 4 illustrates the master control of traffic in the piconet through the addressing of each slave's Active Member address (AM_addr) field in the Packet Header (prior art). The Packet Type field enables the slave to determine the number of time slots that are occupied by master's packet. The slave being addressed is allowed to transmit packets to the master in the slot immediately following the last time slot of master's packet. The master assigns the AM_addr of each slave during Page. There can be as many as seven active slaves in one piconet.

It would be advantageous if a Bluetooth device could quickly become a member of a piconet.

It would be advantageous if a Bluetooth device could become a member of a piconet with minimal interruption to any pre-existing piconet member devices.

It would be advantageous if a Bluetooth device could become a member of a piconet without paging, or making inquiries to slave devices in the piconet.

It would be advantageous if a Bluetooth device could join a piconet as a slave without the master device, even temporarily, losing control over the piconet.

SUMMARY OF THE INVENTION

The present invention provides a method to avoid the lengthy inquiry procedure needed to establish a connection when a new BT device seeks to join a piconet. The connection is established with minimal disturbance to current traffic. Instead of making connections to each nearby device using a SDP query, which interrupts the piconet traffic, the present invention method permits a Bluetooth device to find the masters of all nearby piconets and to become a slave when it joins these piconets. This feature is particularly useful for applications for which a master has to be the service provider, for example the gateway as defined in the LAN Access Profile or Dial-up Networking Profile. For other applications, the newly joining slave device can still make SDP queries, once it has become a member of the piconets. Without the present invention mechanism, a BT device must go through Master-Slave (MS) switch during or after the establishment of a connection to seek desired services. The MS switch process is lengthy compared to the present invention, as all slaves of an existing piconet need to be properly scheduled before the master can enter the page_scan state to accommodate the page request from the new device. Therefore, it is desirable to avoid a MS switch in such gateway applications where the master must reserve its capacity for on-going traffic. As long as it's justified by the services/applications, the new slave has the option to request a master-slave (MS) switch after it becomes a member of the piconet.

Accordingly, a method has been provided for establishing communications in a network of Bluetooth protocol devices. The method comprises: establishing a piconet with a master device; broadcasting a piconet beacon frequency at a first predetermined frequency $f(k_B)$ from in the plurality of spread spectrum transmission frequencies; monitoring to receive the piconet beacon frequency; and, in response to receiving the piconet beacon frequency, establishing communications with the piconet.

Broadcasting a piconet beacon frequency includes the master device broadcasting its BD_addr and CLK information in a first downlink FHS packet. The inquiring device derives the master device frequency hopping sequence from the master device BD_addr and master device CLK information.

Following the receiving of the first downlink FHS packet by the inquiring device, the inquiring device transmits a first uplink FHS packet, including the BD_addr of the inquiring device, to the master device. Following the receiving of the first uplink FHS packet, the master device transmits a second downlink FHS packet to the inquiring device that includes an AM_addr, typically in the range from 1 to 7. The inquiring device transmits an ID packet to the master device acknowledging the receipt of the AM_addr.

Following the receiving of the ID packet, the master device transmits a POLL packet to the inquiring device. In response to receiving the POLL packet, the inquiring device transmits a NULL packet to the master device, and higher level protocols are subsequently established between the master device and the inquiring device.

Additional details of the above-described method for establishing Bluetooth communications and a system for establishing communications in a network of Bluetooth protocol devices are provided below.

BRIEF DESCRIPTION OF THE DRAWING

FIG. 1 illustrates a typical Bluetooth piconet (prior art).

FIG. 2 illustrates the general format of a Bluetooth baseband packet (prior art).

FIG. 3 illustrates the payload of an FHS packet (prior art).

FIG. 4 illustrates the master control of traffic in the piconet through the addressing of each slave's Active Member address (AM_addr) field in the Packet Header (prior art).

FIG. 5 depicts the present invention system for establishing communications in a network of Bluetooth protocol communication devices.

FIG. 6 is a timing diagram illustrating the present invention beacon method of performing the inquiry and page functions for access to a piconet.

DETAILED DESCRIPTION OF THE PREFERRED EMBODIMENTS

Figure 7:
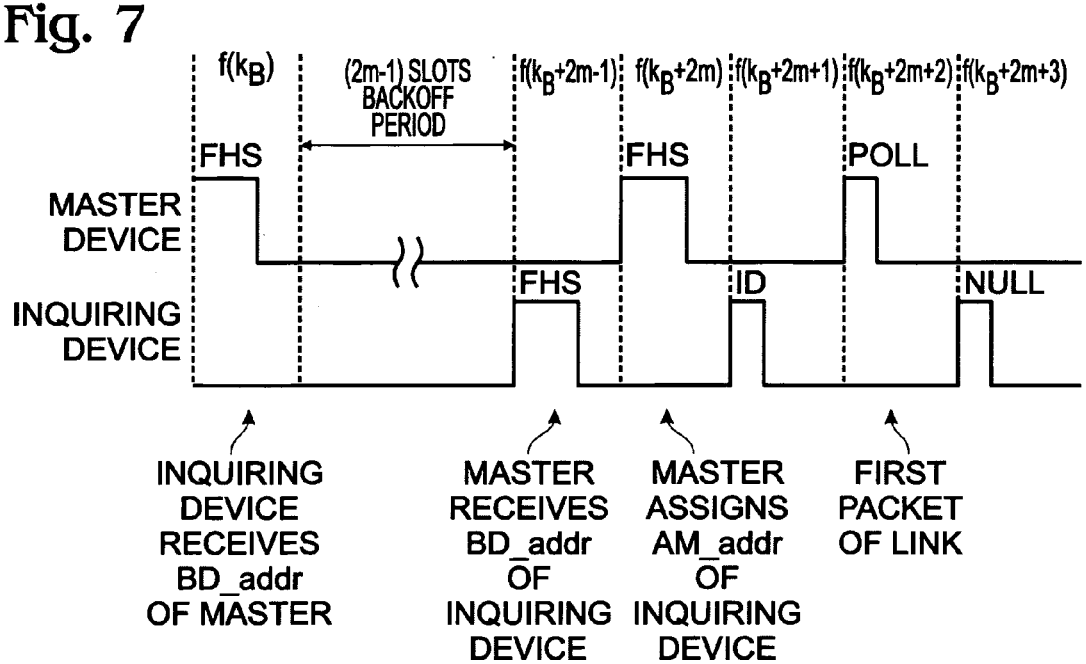
FIG. 7 illustrates messages exchanged between a master device and an inquiring device operating in accordance with the present invention communication establishment system.

FIG. 5 depicts the present invention system for establishing communications in a network of Bluetooth protocol devices. The system 200 comprises a master device 202 with a receiver 204 and a transmitter 206. Master device 202 broadcasts a piconet beacon frequency from transmitter 206. At least one inquiring device, one device 208 is shown having a receiver 210 and a transmitter 212, monitors the piconet beacon frequency. In response to receiving the piconet beacon frequency at receiver 210, the inquiring device 208 establishes communications with the master device 202.

The master device 202 broadcasts the piconet beacon frequency at a first predetermined frequency $f(k_B)$ from among the plurality of spread spectrum broadcast frequencies. Alternately, the master device 202 broadcasts the piconet beacon frequency at a first plurality of predetermined frequencies from among the plurality of spread spectrum broadcast frequencies. The inquiring device 208 monitors the first plurality of piconet beacon frequencies, and in response to receiving one of the piconet beacon frequencies, establishes communications with the master device 202.

The master device 202 broadcasts its BD_addr and CLK information on the piconet beacon frequency in a first downlink FHS packet, and the inquiring device 208 receives the BD_addr and CLK information of the master device 202 in the first downlink FHS packet broadcast on the piconet beacon frequency. The inquiring device 208 derives the master device frequency hopping sequence from the master device BD_addr and CLK information received on the piconet beacon frequency.

Following the reception of the first downlink FHS packet, the inquiring device 208 transmits a first uplink FHS packet to the master device 202. The first uplink FHS packet to the master device 202 includes the inquiring device BD_addr in the FHS packet payload. In addition, the first uplink FHS packet includes a FHS packet access code (AC) derived from the master device BD_addr.

Following the reception of the first uplink FHS packet, the master device 202 transmits a second downlink FHS packet to the inquiring device 208 that includes an access code (AC) derived from the BD_addr of the inquiring device 208 and an AM_addr in the FHS payload, typically in the range from 1 to 7.

Following the reception of the second downlink FHS packet, the inquiring device 208 transmits an ID packet to the master device 202 acknowledging the receipt of the AM_addr. Then, the master device 202 transmits a POLL packet to the inquiring device 208, following the receipt of the ID packet. In response to receiving the POLL packet, the inquiring device 208 transmits a NULL packet to the master device 202. Following the receipt of the NULL packet, the master device 202 establishes higher-level protocols with the inquiring device 208 using conventional processes. At this point in the communication process the inquiring device 208 becomes a piconet slave device.

As depicted in greater detail below (see FIG. 7), the master device 202 broadcasts the first downlink FHS packet in the slot at frequency $f(k_B)$. The inquiring device 208 randomly selects a number m, where m is a number between 1 to 8 for the Contention Period of 15 slots, and transmits the first uplink FHS packet in the slot at frequency $f(k_B+(2 m-1))$. The selection of a random backoff number minimizes the chances of two inquiring units responding in the same slot. The master device 202 transmits the second downlink FHS packet in the slot at frequency $f(k_B+2 m)$, and the inquiring device 208 transmits the ID packet in the slot at frequency $f(k_B+(2 m+1))$.

Typically, a contention period is established equal to fifteen slots for inquiring devices, such as device 208, to respond to the beacon frequency. However, the present invention is not limited to any particular number of slots in the contention period. The master device 202 waits (2 m−1) slots, up to a maximum of fifteen slots, from the broadcast of the piconet beacon frequency at frequency $f(k_B)$ to receive a first uplink FHS packet from an inquiring device 208.

FIG. 6 is a timing diagram illustrating the present invention beacon method of performing the inquiry and page functions for access to a piconet. The master broadcasts a FHS packet whenever it hops to a pre-determined frequency $f(k_B)$. Frequency $f(k_B)$ is one of the 79 frequencies available in 2.4 GHz band and is arbitrarily chosen. That is, any one of the other 78 frequencies could be used to enable the invention. However, it is preferable the selected frequency be one that is not interfered with by microwave ovens. Implementation can also make the selection of $f(k_B)$ be either user configurable, factory preset, or adaptive.

An inquiring device (see FIG. 5) seeking a particular service, tunes to $f(k_B)$ and looks for the FHS packet. Since the channel hopping sequence always follows a pseudo random pattern, the probability of occurrence for $f(k_B)$ in a given interval is fixed. The length of time interval under consideration is of an order of magnitude longer than the average time for a frequency to occur in the random hopping sequence. Even though the time intervals between successive FHS packets are not equal, as opposed to typical time division multiple access (TDMA) systems, an inquiring device can simply listen to this pre-determined frequency $f(k_B)$ and retrieve the master device's information from the received first downlink FHS packet.

The average time for $f(k_B)$ to occur is roughly 79/(1600 hops/s)=50 milliseconds (ms) in a given hopping sequence. The master device transmits and receives packets alternately in every other slot, and $f(k_B)$ can be used in either a transmitting or receiving slot, depending on the phase of the hopping sequence. As $f(k_B)$ can either occur in the slot for master or slave, the average time ($T_B$) between broadcast FHS packets from a master device can be estimated by $$T_B=50*(1+N_s)\text{ms} \qquad \text{Eq. (1)}$$

where $N_s$ is the number of the active slave devices in the existing piconet. Therefore, the average time between broadcast FHS packets $T_B$ is about 100 ms for a piconet with one slave device and 200 ms for a piconet with 3 slave devices, assuming the traffic is evenly distributed between the master device and all slave devices. $T_B$ can be as long as 400 ms when $N_s=7$.

It is possible, however, that the $f(k_B)$ occurs in the 3rd or 5th slot of a multiple-slot packet, preventing the master device from sending the first downlink FHS packet. The master device resolves this problem by setting up a timer when it enters this special broadcast mode. If the timer expires without the first downlink FHS being sent, the master can schedule the event by changing the packet types, since it has control over the traffic of the whole piconet.

For an inquiring device to decode the broadcast first downlink FHS packet, the AM_addr field of the packet header is set to zero (in hex, 0X0) to indicate a broadcast packet. Also, the SYNC Word field of AC is derived from a special BD_addr reserved for this purpose. It is similar to the General Inquiry Access Code (GIAC), in which the SYNC Word is derived from Lower Address Part (LAP) of a reserved BD_addr. Here, the name Beacon Access Code (BAC) is used.

The LAP for deriving SYNC of BAC is selected to be within the range other than the block of 64 LAPs reserved for IAC. An inquiring device, not configured in accordance with present invention system, operates in the conventional manner, not responding to beacon broadcasting from the master device. On the other hand, an inquiring device operating in accordance with the present invention system uses the Beacon Access Code (BAC) generated by the special LAP, and looks for a FHS packet by tuning to the designated frequency broadcast by the master device, when it seeks to join a piconet.

FIG. 7 illustrates messages exchanged between a master device and an inquiring device operating in accordance with the present invention communication establishment system. After an inquiring device decodes the first downlink FHS packet, it can retrieve the master device's BD_addr and CLK information. After a (2 m−1)-slot long Backoff Period (where m is a randomly selected number between 1 to 8 for the Contention Period of 15 slots), the inquiring device sends the first uplink FHS packet in the slot on frequency $f(k_B+2 \text{ m}-1)$, which is derived from the master device hopping sequence. Note, the inquiring device can only transmit in the odd numbered slots. The FHS packet from inquiring device contains the inquiring device BD_addr in the payload and uses an AC derived from master device's BD_addr. Once the master device receives FHS packet from the inquiring device, it recognizes that a device is requesting connection, and the second downlink FHS packet is sent from the master device to the inquiring device in the slot with frequency $f(k_B+2 \text{ m})$. The second downlink FHS packet from the master device uses the AC derived from inquiring device's BD_addr and carries an AM_addr assigned to the inquiring device in the payload.

The inquiring device confirms the receipt of the AM_addr with an ID packet in the slot of frequency $f(k_B+2 \text{ m}+1)$. After receiving the ID packet from the inquiring device, the master device sends a POLL packet. A NULL packet is expected from the inquiring device before master device proceeds to communicate with higher layer protocols. This is similar to normal Page process of Bluetooth, see the Bluetooth specification.

It is efficient to avoid collisions when multiple inquiring devices attempt to join the same piconet simultaneously. A contention period is introduced after each slot of frequency $f(k_B)$, to reserve a period of time for devices to contend for the access after each first downlink FHS packet is broadcast. The master device resumes normal piconet traffic if no response is received during the contention period. Alternately, the master device will respond to a request from an inquiring device received during the contention period. For example, if the duration of contention period is 15 time slots, the master will hold the piconet activities during this time and wait for the first uplink FHS packet. Each inquiring device receiving the broadcast (first downlink) FHS packet selects a random number m (1–8 in example above) and sets a Backoff counter equal to 2 m−1 for counting down. The first inquiring device counter that reaches zero (the inquiring device that selects the lowest value of m) is granted the right to transmit the first uplink FHS packet.

The probabilities for a failed access attempt (no device succeeds) due to a collision in the 15-slot contention period (CP) are listed in Table 1 as a function of the number of devices contending for access to the piconet.

TABLE 1

Probability of failed access for the 15-slot contention period

| $N_d$, No. of device in contention for accessing the piconet | $P_{co}(N_d)$, Probability of failed access for a 15-slot Contention Period |
|---|---|
| 2 | 0.1250 |
| 3 | 0.0156 |
| 4 | 0.0840 |
| 5 | 0.0344 |
| 6 | 0.1645 |

It is noted that $P_{co}(N_d)$ doesn't increase monotonically as N is increases. The reason for this is that if two devices choose the same backoff number and collision occurs in slot $(k_B+2 \text{ m}-1)$ (see FIG. 7), the master device cannot decode the inquiring device address. As a result, no second downlink FHS packet is sent in slot $(k_B+2 \text{ m})$. In this situation, the inquiring device with the second lowest backoff number can proceed to send its first uplink FHS packet for access, as long as there are no further collisions. This explains why the value of $P_{co}(N_d)$ is lower for odd numbers of N.

The time required to access the piconet with the present invention method depends on $T_B$ of Eq. (1) and $P_{co}(N_d)$ of Table 1. The time $T_{ac}$ can be calculated by Eq. (2) as follows:

$$T_{ac} = T_B * [1 - P_{co}(N_d)] + 2T_B * [1 - P_{co}(N_d)] * \qquad \text{Eq. (2)}$$
$$[P_{co}(N_d)] + 3T_B[1 - P_{co}(N_d)] * [P_{co}(N_d)]^2 + \ldots$$
$$= \Sigma^{\infty}(nT_B) * [1 - P_{co}(N_d)] * [P_{co}(N_d)]^{(n-1)}$$

In Eq. (2), n is the number of contention periods required for the first successful connection.

Figure 8:
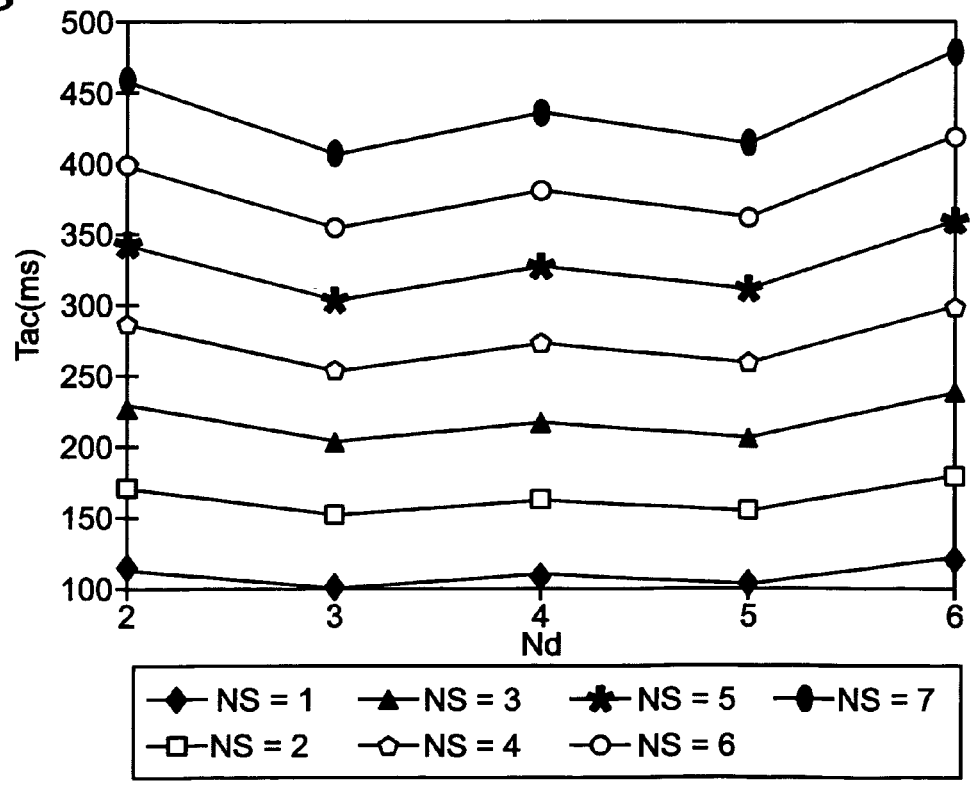
FIG. 8 is a plot representing the results of calculating $T_{ac}$ as a function of $N_d$, the number of inquiring devices contending for access to the piconet (Eq. (2)).

FIG. 8 is a plot representing the results of calculating $T_{ac}$ as a function of $N_d$, the number of inquiring devices contending for access to the piconet (Eq. (2)). Each curve in FIG. 8 represents the different number of $N_s$ for Eq. (1). These curves indicate that the major contribution to $T_{ac}$ is from $T_B$ given by Eq. (1) while the probability of three successive collisions is less than 0.5%, even for $N_d=5$. It should be noted that the results in FIG. 8 are very conservative as the time between the instant that an inquiring device starts to listen to frequency $f(k_B)$ and the occurrence of the first broadcast (first downlink) FHS packet from master device is not taken into account. That is, FIG. 8 depicts the worst-case scenario. The longest $T_{ac}$ approaches 480 ms when $N_d=6$ and $N_s=7$. Although this is not likely to happen in practical situations, it's still significantly less than the 10.24 seconds needed for a conventional Bluetooth protocol inquiry.

It is expected that the number of devices looking for a piconet at the same time is small and a short CP is sufficient for most situations. In the example above, a CP of 15 slots will "cost" a piconet approximately 10% of the traffic bandwidth when $N_s=1$. The percentage of lost traffic decreases when the number of slave devices increase, as the chance of the master device hopping to $f(k_B)$ is less likely. This is a reasonable assumption, as the master device will be busy with the existing slaves in the piconet, and not have enough capacity to accommodate new members. In some implementations, the master device schedules and requests that certain active slave devices in the piconet enter a power saving mode. Such a power saving mode increases the piconet capacity, permitting new members to join. For example, $T_{ac}$ is less than 250 ms when $N_s=3$, and less than 120 ms when $N_s=1$.

When the piconet is idle and traffic is light, it is of concern that use of a single frequency for broadcasting a packet as described in this invention would violate the requirements of ISM band usage. To resolve this issue, the master can send POLL packets periodically, in addition to the first downlink FHS packet in the slot of frequency $f(k_B)$. The interval between the POLL packets is short enough that the master device appears to hop to every frequency and meet the regulatory requirements.

As mentioned above, the present invention system of broadcasting a first downlink FHS packet can be applied to more than just one frequency. For example, there can be two (or more) broadcast frequencies. Inquiring devices could respond to either, or both of the beacon frequencies to establish communications with the network. In some aspects of the invention, inquiring devices would be programmed to monitor one of the broadcast frequencies from the plurality of broadcast frequencies. The system tradeoff would be the reduction of piconet traffic bandwidth in exchange for a greater number of frequencies dedicated to channel access.

In other aspects of the invention, the master device embeds CP information in the broadcast FHS. Then, the length of the CP, and the selection of the value m by the inquiring devices is dynamically adjusted in response to traffic conditions in existing piconet.

Figure 9:
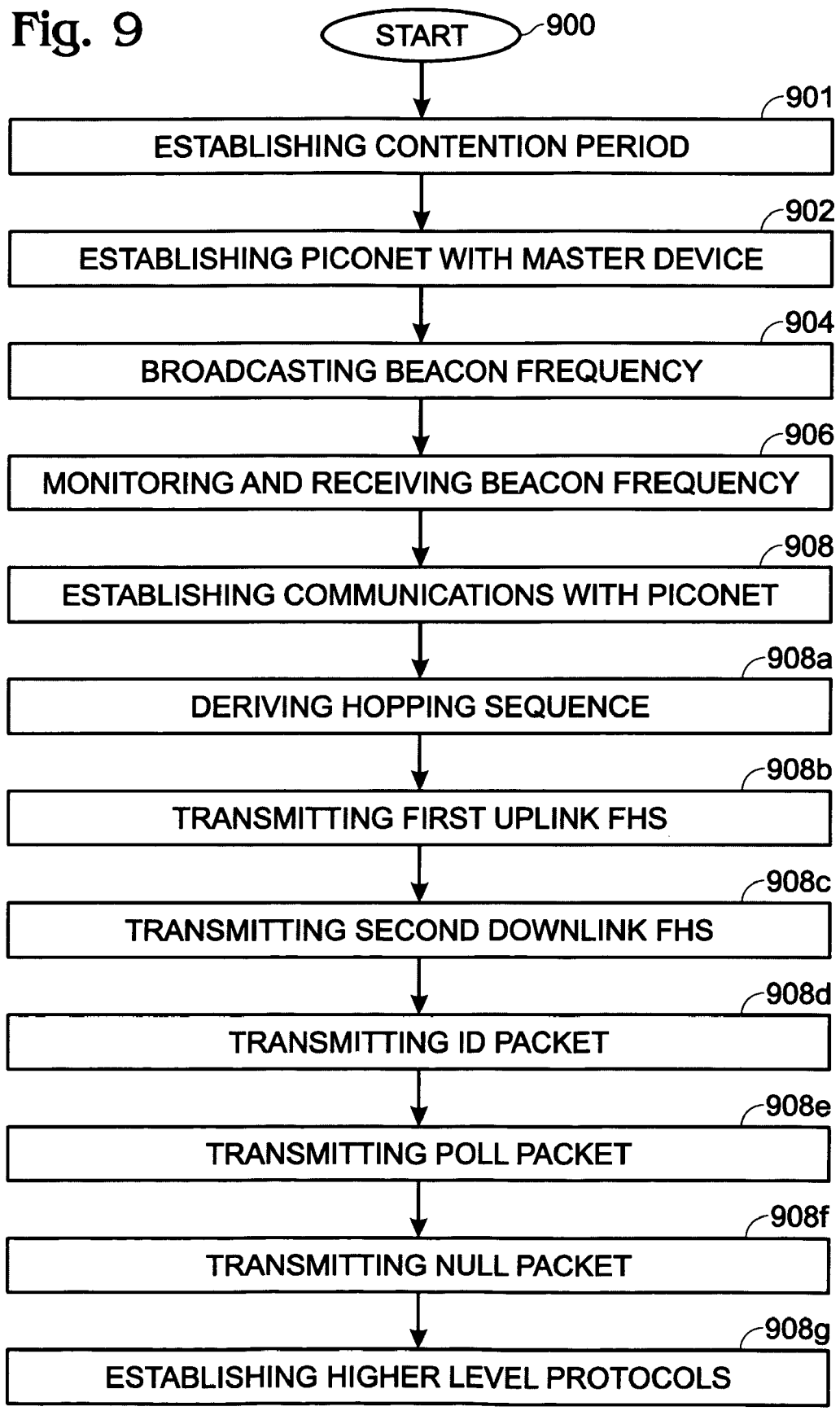
FIG. 9 is a flowchart illustrating the present invention method for establishing communication in a network of Bluetooth protocol devices.

FIG. 9 is a flowchart illustrating the present invention method for establishing communications in a network of Bluetooth protocol devices. Although the method is depicted as a sequence of numbered steps for clarity, no order should be inferred from the numbered unless explicitly stated. The method begins at Step 900. Step 902, prior to broadcasting the piconet beacon frequency (Step 904), establishes a piconet with a master device. Step 904 broadcasts a piconet beacon frequency at a first predetermined frequency $f(k_B)$ from the plurality of spread spectrum transmission frequencies. Typically, broadcasting a piconet beacon frequency includes the master device broadcasting its BD_addr and CLK information. Step 906 monitors, to receive the piconet beacon frequency. Receiving the piconet beacon frequency includes an inquiring device receiving the BD_addr and CLK information of the master device in a first downlink FHS packet. Step 908, in response to receiving the piconet beacon frequency, establishes communications with the piconet.

Step 908 includes sub-steps. In Step 908a the inquiring device derives the master device frequency hopping sequence from the master device BD_addr and master device CLK information. Step 908b, following the receiving of the first downlink FHS packet by the inquiring device in Step 906, transmits a first uplink FHS packet from the inquiring device to the master device. The transmission of Step 908b includes transmitting the inquiring device BD_addr in the FHS packet payload to the master device. Further, transmitting a first uplink FHS packet from the inquiring device to the master device in Step 908b includes transmitting a FHS packet access code (AC) derived from the master device BD_addr.

Step 908c, following the receiving of the first uplink FHS packet by the master device, transmits a second downlink FHS packet from the master device to the inquiring device. Transmitting a second downlink FHS packet from the master device to the inquiring device in Step 908c includes transmitting an AM_addr in the FHS packet payload. Further, transmitting a second downlink FHS packet from the master device to the inquiring device includes transmitting a FHS packet access code derived from the inquiring device BD_addr.

Step 908d, following the receiving of the second downlink FHS packet by the inquiring device in Step 908c, transmits an ID packet from the inquiring device to the master device, acknowledging the receipt of the AM_addr. Step 908e, following the receiving of the ID packet by the master device in Step 908d, transmits a POLL packet from the master device to the inquiring device. Step 908f, in response to receiving the POLL packet in Step 908e, transmits a NULL packet from the inquiring device to the master device. Following Step 908f, Step 908g establishes higher level protocols between the master device and the inquiring device. Establishing higher level protocols between the master device and the inquiring device in Step 908g includes the inquiring device becoming a piconet slave device.

In some aspects of the invention broadcasting a piconet beacon frequency in Step 904 includes the master device broadcasting the first downlink FHS packet in the slot at frequency $f(k_B)$. Then, transmitting the first uplink FHS packet in Step 908b includes sub-steps. In Step 908b1 (not shown) the inquiring device randomly selects a number m, where m is a number between 1 to 8 for the Contention Period of 15 slots. In Step 908b2 (not shown) the inquiring device transmits the first uplink FHS packet in the slot at frequency $f(k_B+(2\ m-1))$. In Step 908c the master device transmits the second downlink FHS packet in the slot at frequency $f(k_B+2\ m)$. In Step 908d the inquiring device transmits the ID packet in the slot at frequency $f(k_B+(2\ m+1))$.

Some aspects of the invention include a further step. Step 901 establishes a contention period equal to fifteen slots. Then, Step 908 includes the master device waiting (2 m−1) slots from the broadcast of the piconet beacon frequency at frequency $f(k_B)$ to receive a first uplink FHS packet from an inquiring device. Typically, Step 908 includes the master device waiting a maximum of fifteen slots from the broadcast of the piconet beacon frequency at frequency $f(k_B)$ to receive a first uplink FHS packet from an inquiring device.

In some aspects of the invention Step 904 includes the master device broadcasting at a first plurality of predetermined beacon frequencies from the plurality of spread spectrum transmission frequencies. Then, Step 906 includes monitoring the first plurality of beacon frequencies, and Step 908 establishes communications with the piconet in response to receiving one of the plurality of piconet beacon frequencies.

Figure 10:
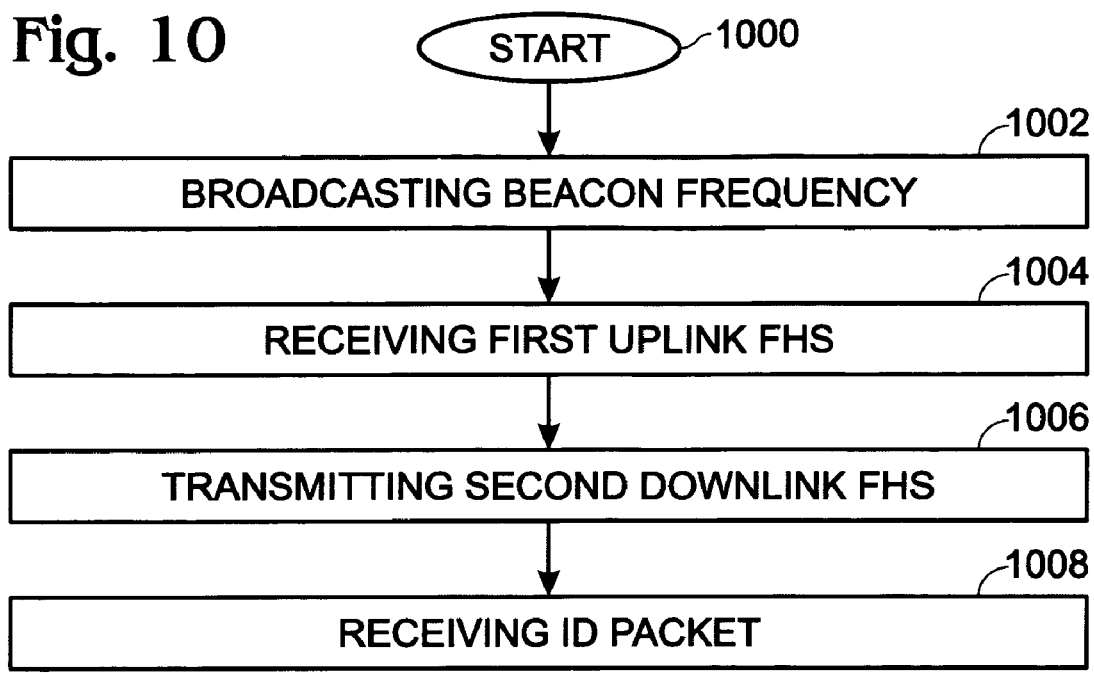
FIG. 10 is a flowchart illustrating a method for a master device to permit the establishment of piconet communications in a network of Bluetooth protocol devices.

FIG. 10 is a flowchart illustrating a method for a master device to permit the establishment of piconet communications in a network of Bluetooth protocol devices. The method begins at Step 1000. Step 1002 broadcasts a piconet beacon frequency at a first predetermined frequency $f(k_B)$ from the plurality of spread spectrum transmission frequencies. Broadcasting a piconet beacon frequency includes the master device broadcasting its BD_addr and CLK information in a first downlink FHS packet. Step 1004 receives a first uplink FHS packet from an inquiring device, in response to the broadcasting the piconet beacon frequency in Step 1002. Receiving a first uplink FHS packet from the inquiring device includes receiving the inquiring device BD_addr in the FHS packet payload and a FHS packet access code (AC) derived from the master device BD_addr.

Step 1006, following the receiving of the first uplink FHS packet by the master device, transmits a second downlink FHS packet from the master device to the inquiring device. Transmitting a second downlink FHS packet from the master device to the inquiring device in Step 1006 includes transmitting an AM_addr in the FHS packet payload and a FHS packet access code derived from the inquiring device BD_addr.

Step 1008, following the transmission of the second downlink FHS packet by the master device in Step 1006, receives an ID packet from the inquiring device acknowledging the receipt of the AM_addr.

Figure 11:
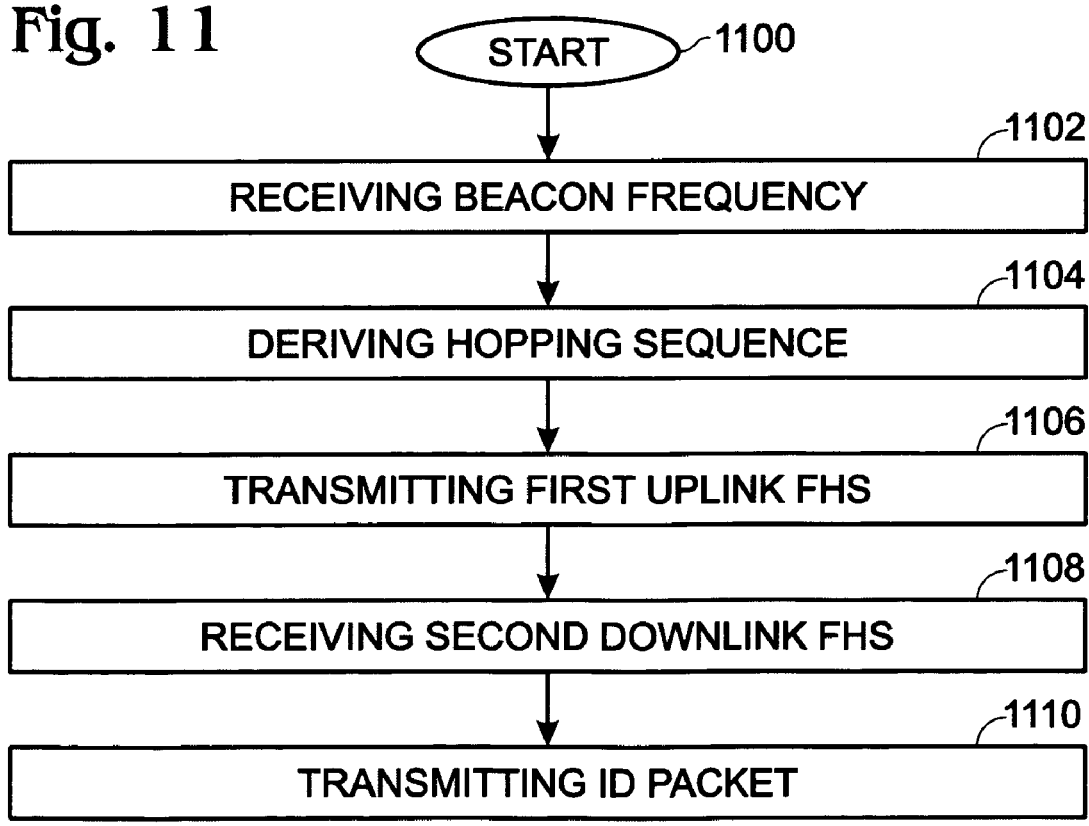
FIG. 11 is a flowchart illustrating a method for an inquiring device to establish communications with a piconet in a network of Bluetooth protocol devices.

FIG. 11 is a flowchart illustrating a method for an inquiring device to establish communications with a piconet in a network of Bluetooth protocol devices. The method begins in Step 1100. Step 1102 monitors to receive the piconet beacon frequency at a first predetermined frequency $f(k_B)$ from the plurality of spread spectrum transmission frequencies. Receiving the piconet beacon frequency includes receiving a master device BD_addr and CLK information in a first downlink FHS packet. Step 1104 derives the master device frequency hopping sequence from the master device BD_addr and master device CLK information. Step 1106, in response to receiving the piconet beacon frequency, transmits a first uplink FHS packet to establish communications with the piconet. Step 1106, following the receiving of the first downlink FHS packet by the inquiring device in Step 1102, transmits a first uplink FHS packet including the inquiring device BD_addr in the FHS packet payload and a FHS packet access code (AC) derived from the master device BD_addr.

Step 1108, following the transmission of the first uplink FHS packet, receives a second downlink FHS packet from the master device including an AM_addr in the FHS packet payload and a FHS packet access code derived from the inquiring device BD_addr. Step 1110, following the receiving of the second downlink FHS packet by the inquiring device, transmits an ID packet to the master device, acknowledging the receipt of the AM_addr.

A system and method have been provided for an inquiring Bluetooth device to establish communications with an established piconet. Some examples of the use of a single beacon frequency have been given. Other means of responding to such a beacon frequency could be enabled by those skilled in the art. Further, variations and embodiments using a plurality of beacon frequencies could also be enabled by one with skill in the art. The present invention beacon frequency system could also be enabled with a variable contention period.

We claim:

1. In a network of Bluetooth protocol devices, a method for establishing communications comprising:
   prior to broadcasting a piconet beacon frequency, establishing a piconet with a master device;
   the master device broadcasting the piconet beacon frequency at a first predetermined frequency $f(k_B)$ from a plurality of spread spectrum transmission frequencies, wherein the piconet beacon frequency includes the master device's Bluetooth address (BD_addr) and clock (CLK) information;
   an inquiring device monitoring to receive the piconet beacon frequency, including the BD_Addr and CLK information of the master device in a first downlink frequency hop synchronization (FHS) packet, and deriving a master device frequency hopping sequence from the master device BD_addr and master device CLK information; and
   following the receiving of the first downlink FHS packet by the inquiring device, transmitting a first uplink FHS packet from the inquiring device to the master device, including the inquiring device BD_addr in the FHS packet payload and an access code (AC) derived from the master device BD_addr.

2. The method of claim 1 wherein establishing communications includes, following the receiving of the first uplink FHS packet by the master device, transmitting a second downlink FHS packet from the master device to the inquiring device.

3. The method of claim 2 wherein the transmitting the second downlink FHS packet from the master device to the inquiring device includes transmitting an active member address (AM_addr) in the FHS packet payload.

4. The method of claim 3 wherein transmitting a second downlink FHS packet from the master device to the inquiring device includes transmitting a FHS packet access code derived from the inquiring device BD_addr.

5. The method of claim 4 wherein establishing communications includes, following a receiving of the second downlink FHS packet by the inquiring device, transmitting an ID packet from the inquiring device to the master device, acknowledging a receipt of the AM_addr.

6. The method of claim 5 wherein establishing communications includes:
   following a receiving of the ID packet by the master device, transmitting a POLL packet from the master device to the inquiring device;
   in response to receiving the POLL packet, transmitting a NULL packet from the inquiring device to the master device; and
   establishing higher level protocols between the master device and the inquiring device.

7. The method of claim 6 wherein establishing higher level protocols between the master device and the inquiring device includes the inquiring device becoming a piconet slave device.

8. The method of claim 7 wherein broadcasting a piconet beacon frequency includes the master device broadcasting the first downlink FHS packet in a slot at frequency $f(k_B)$;
   wherein transmitting the first uplink FHS packet includes:
   the inquiring device randomly selecting a number m, where m is a number between 1 to 8 for a contention period of 15 slots;
   the inquiring device transmitting the first uplink FHS packet in the slot at frequency $f(k_B+(2\ m-1))$;
   wherein the master device transmits the second downlink FHS packet in the slot at frequency $f(k_B+2\ m)$; and,
   wherein the inquiring device transmits the ID packet in the slot at frequency $f(k_B+(2\ m+1))$.

9. The method of claim 8 wherein the inquiring device randomly selecting a number m includes randomly selecting a number m between 1 to 8; and,
   the method further comprising:
   establishing a contention period equal to fifteen slots; and
   the master device waiting $(2\ m-1)$ slots from the broadcast of the piconet beacon frequency at frequency $f(k_B)$ to receive a first uplink FHS packet from an inquiring device.

10. The method of claim 8 further comprising:
    establishing a contention period equal to fifteen slots; and
    the master device waiting a maximum of fifteen slots from the broadcast of the piconet beacon frequency at frequency $f(k_B)$ to receive a first uplink FHS packet from an inquiring device.

11. The method of claim 1 further comprising:
    establishing a piconet with a master device; and
    wherein broadcasting a piconet beacon frequency includes the master device broadcasting at a first plurality of predetermined piconet beacon frequencies from the plurality of spread spectrum transmission frequencies;

wherein monitoring for the piconet beacon frequency includes monitoring the first plurality of piconet beacon frequencies; and wherein establishing communications with the piconet includes establishing communications in response to receiving one of the plurality of monitored piconet beacon frequencies.

12. In a network of Bluetooth protocol devices, a method for a master device to permit the establishment of piconet communications comprising:

a master device broadcasting a piconet beacon frequency in a first downlink FHS packet including the master device's BD_addr and CLK information, at a first predetermined frequency $f(k_B)$ from a plurality of spread spectrum transmission frequencies;

receiving a first uplink FHS packet from an inquiring device, in response to broadcasting the piconet beacon frequency, wherein the first uplink FHS packet includes the inquiring device BD_addr in the FHS packet payload and a FHS packet access code (AC) derived from the master device BD_addr; and following the receiving of the first uplink FHS packet by the master device, transmitting a second downlink FHS packet from the master device to the inquiring device with an AM_addr in the FHS packet payload.

13. The method of claim 12 wherein transmitting a second downlink FHS packet from the master device to the inquiring device includes transmitting a FHS packet access code derived from the inquiring device BD_addr.

14. The method of claim 13 further comprising:

following the transmission of the second downlink FHS packet by the master device, receiving an ID packet from the inquiring device acknowledging the receipt of the AM_addr.

15. In a network of Bluetooth protocol devices, a method for an inquiring device to establish communications with a piconet, the method comprising:

monitoring to receive the piconet beacon frequency at a first predetermined frequency $f(k_B)$ from a plurality of spread spectrum transmission frequencies, wherein the piconet beacon frequency includes a master device Bluetooth address (BD_addr) and clock (CLK) information in a first downlink FHS packet;

in response to receiving the piconet beacon frequency, transmitting a first uplink frequency hop synchronization (FHS) packet to establish communications with the piconet, wherein the first uplink FHS packet includes the inquiring device BD_addr in the uplink FHS packet payload and a FHS packet access code (AC) derived from the master device BD_addr;

following the transmission of the first uplink FHS packet, receiving a second downlink FHS packet from the master device including an active member address (AM_addr) in the second downlink FHS packet payload and a FHS packet access code derived from the inquiring device BD_addr; and deriving a master device frequency hopping sequence from the master device BD_addr and master device CLK information.

16. The method of claim 15 further comprising:

following the receiving of the second downlink FHS packet by the inquiring device, transmitting an ID packet to the master device, acknowledging the receipt of the AM_addr.

17. A system for establishing communications in a network of Bluetooth protocol devices, the system comprising:

a master device broadcasting a piconet beacon frequency at a first predetermined frequency $f(k_B)$ from among a plurality of spread spectrum broadcast frequencies, including the master device's Bluetooth address (BD_addr) and clock (CLK) information;

at least one inquiring device monitoring the master device's piconet beacon frequency, receiving the master device's BD_addr and CLK information of the master device in a first downlink frequency hop synchronization (FHS) packet broadcast, deriving a master device frequency hopping sequence from the master device's BD_addr and CLK information, and transmitting a first unlink FHS packet to the master device following the reception of the first downlink FHS packet, including an inquiring device BD_addr in the first uplink FHS packet payload, and a FHS packet access code (AC) derived from the master device BD_addr.

18. The system of claim 17 wherein the master device broadcasts the piconet beacon frequency at a first plurality of predetermined frequencies from among the plurality of spread spectrum broadcast frequencies; and, wherein the inquiring device monitors the first plurality of piconet beacon frequencies and, in response to receiving one of the piconet beacon frequencies, establishes communications with the master device.

19. The system of claim 17 wherein the master device transmits a second downlink FHS packet to the inquiring device following the reception of the first uplink FHS packet.

20. The system of claim 19 wherein the master device transmits the second downlink FHS packet to the inquiring device including an active member address (AM_addr) in the second downlink FHS payload.

21. The system of claim 20 wherein the master device transmits a second downlink FHS packet to the inquiring device including a FHS packet access code derived from the inquiring device BD_addr.

22. The system of claim 21 wherein the inquiring device transmits an ID packet to the master device following a reception of the second downlink FHS packet, acknowledging a receipt of the AM_addr.

23. The system of claim 22 wherein the master device transmits a POLL packet to the inquiring device following a receipt of the ID packet by the master device;

wherein the inquiring device transmits a NULL packet to the master device in response to receiving the POLL packet; and, wherein the master device establishes higher level protocols with the inquiring device following the receipt of the NULL packet.

24. The system of claim 23 wherein the inquiring device becomes a piconet slave device following the establishment of higher level protocols with the master device.

25. The system of claim 24 wherein the master device broadcasts the first downlink FHS packet in a slot at frequency $f(k_B)$;

wherein the inquiring device randomly selects a number m, and transmits the first uplink FHS packet in the slot at frequency $f(k_B+(2m-1))$;

wherein the master device transmits the second downlink FHS packet in the slot at frequency $f(k_B+2m)$; and, wherein the inquiring device transmits the ID packet in the slot at frequency $f(k_B+(2m+1))$.

26. The system of claim 25 in which a contention period equal to fifteen slots is established;

wherein the inquiring device randomly selecting a number m includes randomly selecting a number m between 1 to 8; and, wherein the master device waits (2 m−1) slots from the broadcast of the piconet beacon frequency at frequency $f(k_B)$ to receive a first uplink FHS packet from an inquiring device.

27. The system of claim 26 in which a contention period equal to fifteen slots is established;

wherein the master device waits a maximum of fifteen slots from the broadcast of the piconet beacon frequency at frequency $f(k_B)$ to receive a first uplink FHS packet from an inquiring device.

28. A Bluetooth protocol device inquiring device to establish communications with a piconet, the Bluetooth protocol inquiring device comprising:

a receiver having an input to monitor and receive a piconet beacon frequency at a first predetermined frequency $f(k_B)$ from among a plurality of spread spectrum broadcast frequencies, wherein the piconet beacon frequency includes a first downlink frequency hop synchronization (FHS) packet with the master device Bluetooth address (BD_addr) and clock (CLK) information;

a transmitter having an output to establish communications with a piconet master device in response to receiving the piconet beacon frequency;

wherein the Bluetooth protocol inquiring device derives the master device frequency hopping sequence from the master device BD_addr and CLK information; and wherein the transmitter transmits a first uplink FHS packet, including BD_addr, to the a Bluetooth protocol inquiring piconet master device following the reception of the first downlink FHS packet.

* * * * *